June 29, 1926.
G. A. SAMUELS
AUTOMOBILE STEERING MECHANISM
Filed June 17, 1925
1,590,858
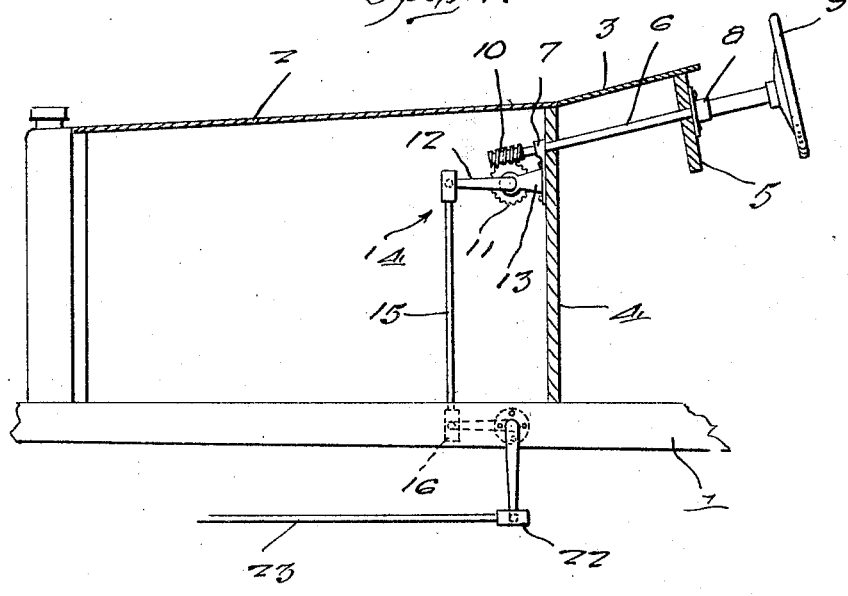
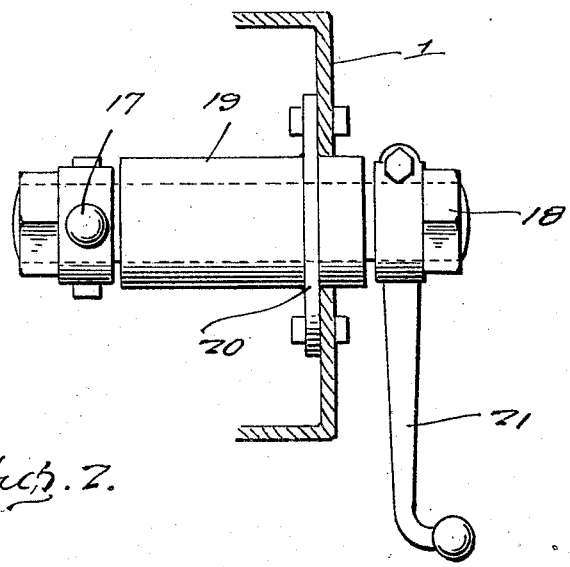
Inventor
G. A. Samuels
By Clarence A. O'Brien
Attorney Patented June 29, 1926.

1,590,858

UNITED STATES PATENT OFFICE.

GLENN A. SAMUELS, OF BINGHAMTON, NEW YORK.

AUTOMOBILE STEERING MECHANISM.

Application filed June 17, 1925. Serial No. 37,769.

This invention relates to an improvement to be used in association with the steering gear of an automobile.

One feature of the invention is to dispose the steering wheel and its shaft at an angle with respect to the driver's seat, to facilitate convenient operation when seated in a comfortable position, and to space the steering wheel a considerable distance away from the seat to afford more room in getting in and out of the driver's compartment.

More specifically speaking, I propose a structure wherein the hand wheel is disposed in substantial parallelism with the inclined instrument board and the shaft upon which it is mounted is extended through the instrument board and the dash board to afford a firm bearing and to accomplish the important results stated.

Other structural details are employed to make for an efficient and practical structure and these will become apparent from the following detailed description and set out particularly in the appended claims.

In the accompanying drawings, forming a part of this application, and in which like numerals are employed to designate like parts throughout the same:

Figure 1 is a view showing a portion of the forward part of the automobile, in section, with the improved steering mechanism in association therewith, the latter being in elevation.

Figure 2 is an enlarged detailed elevational view of the crank shaft which is mounted upon the chassis bar of the frame.

Referring to the drawings in detail, the reference character 1 designates the side bars of the automobile chassis or frame, 2 designates the hood, 3 the windshield cowl, 4 the dash board, and 5 the instrument board. These are conventional parts of a common type of automobile.

In accordance with the present invention, I employ a forwardly and downwardly inclined shaft 6, extending through appropriate bearings 7 and 8 on the dash board and instrument board respectively. The rear portion of the shaft extends a short distance beyond the instrument board and is disposed at a substantial right angle to the surface thereof. The hand wheel 9 is fixedly connected thereto. The hand wheel, as before stated, is in close spaced parallelism with the instrument board, for disposing it in a convenient position to afford easy manipulation by the driver and to elevate it above the seat and to take it away from the seat to afford more room in getting in and out of the front or driver's compartment. By having the shaft extending through the board specified, it is disposed out of the space in which the driver's feet and legs are sometimes placed. On the forward end of the shaft and beneath the hood 2 is a worm 10, the threads of which are in mesh with the teeth of a gear 11, fixed on a shaft carrying a right angular crank arm 12. The shaft is journaled in an appropriate bracket 13 mounted on the dash board, at the approximate elevation indicated. At 14 the crank arm has universal or ball and socket connection with a depending link 15. At its lower end, this link has universal connection at 16 with a horizontal crank arm 17. The crank arm 17 is adjustably mounted on a rock shaft 18 journaled for oscillation in the bearing sleeve 19. This bearing sleeve is provided with an attaching flange 20 bolted or otherwise fixedly connected to the web of the chassis bar 1. The shaft extends through and beyond the bearing and a depending crank arm 21 is clamped thereon. The relation of the crank arm may be varied by adjusting the clamp. At 22 this depending crank has universal connection with the forwardly extending operating rod 23 of the conventional steering gear of the automobile.

In operation, it will be seen that by turning the hand wheel 9 in the usual way, the shaft 6 will be rotated in a corresponding direction and through the medium of the worm and pinion will raise and lower the crank arm 12. Movement of this crank arm, in this manner, serves to operate upon the link 15 and oscillatory shaft 18, to move the depending crank arm 21 back and forth, thus actuating the operating rod 23, in the customary manner. This is believed to be a novel arrangement for power transmission from a comparatively short substantially horizontal steering shaft. The alterations to the marketed cars to accommodate a structure of this kind will be comparatively small and the forward portion of the steering gear need not be touched at all. These and other advantages and features of the invention have doubtless been made apparent by the foregoing description and drawings, and therefore a more lengthy description is deemed unnecessary.

While the preferred embodiment of the invention has been shown and described, it is to be understood that minor changes coming within the field of invention claimed may be resorted to, if desired.

I claim:

1. In a steering mechanism of the class described, a pair of bearings, a steering wheel shaft journaled for rotation in said bearings, a steering wheel fixedly connected to the rear end of said shaft, a vertically disposed link, a horizontally disposed oscillatory shaft, a bearing for the last named shaft, a crank arm carried by said last named shaft, a universal connection between said crank arm and link, a depending crank arm also carried by the oscillatory shaft, a universal connection carried by said last named crank arm, and adapted for association with a horizontal steering gear operating rod, and operating means between said steering gear shaft and link.

2. In a steering mechanism of the class described, a bracket adapted to be attached to a dash board, a rock shaft mounted upon said bracket, a pinion carried by said rock shaft, a crank arm also carried by said rock shaft, a vertical depending link, universal connections between said crank arm and link, a steering wheel shaft, a worm carried by one end of the shaft and cooperating with said pinion, a hand wheel carried by the opposite end of the shaft, and means whereby said link may be operatively connected with a steering gear operating rod.

3. A steering mechanism of the class described comprising a steering wheel shaft, bearings for said shaft adapted to be mounted upon a dash board and instrument board respectively, a steering wheel connected to the rear end of said shaft, a bracket adapted to be mounted on said dash board, a rock shaft carried by said bracket, a crank arm carried by the rock shaft, an operating connection between the steering rod shaft and rock shaft, a depending link, a universal connection between said link and said crank arm, an oscillatory shaft adapted to be mounted upon a chassis bar, crank arms connected with said oscillatory shaft, and a universal connection between the lower end of said link and one of said crank arms.

In testimony whereof I affix my signature.

GLENN A. SAMUELS.